United States Patent [19]

Shirahama et al.

[11] Patent Number: 5,156,060
[45] Date of Patent: Oct. 20, 1992

[54] SHIFT LEVER CONTROL DEVICE

[75] Inventors: Katsunori Shirahama; Takumi Watanabe; Hiroshi Yamazaki, all of Kanagawa, Japan

[73] Assignees: Nissan Motor Co., Ltd.; Ohi Seisakusho Co., Ltd., both of Yokohama, Japan

[21] Appl. No.: 739,231

[22] Filed: Aug. 1, 1991

[30] Foreign Application Priority Data

Aug. 20, 1990 [JP] Japan .................. 2-219667

[51] Int. Cl.[5] .............. F16H 59/02; B60K 20/02
[52] U.S. Cl. .................. 74/475; 74/473 P; 200/61.88
[58] Field of Search ............ 74/473 R, 473 P, 475, 74/527; 200/61.88

[56] References Cited

U.S. PATENT DOCUMENTS 4,991,460  2/1991  Shirahama et al. ............ 74/473 P
5,044,221  9/1991  Suzuki et al. .................. 74/475

FOREIGN PATENT DOCUMENTS 60-195225  12/1985  Japan .

Primary Examiner—Richard Lorence
Attorney, Agent, or Firm—Foley & Lardner

[57] ABSTRACT

A shift lever control device is disclosed which comprises a pivot structure for permitting a shift lever to pivot in both first and second directions which are perpendicular to each other; a bracket which is pivotal together with the shift lever in the first direction and has a mounting portion; a cam plate rotatably mounted on the mounting portion and engaged with the shift lever so that when the shift lever pivots in the second direction, the cam plate is rotated on the mounting portion; a check structure for making the rotational movement of the cam plate in a snap action manner; a structure defining a cam surface on a periphery of the cam plate; and a single switch having a sensor pin which slidably contacts with the cam surface of the cam plate, so that the switch selectively assumes ON and OFF conditions in response to the rotational movement of the cam plate.

14 Claims, 2 Drawing Sheets

SHIFT LEVER CONTROL DEVICE

BACKGROUND OF THE INVENTION

1. Field of the Invention

The present invention relates to shift lever control devices for use in wheeled motor vehicles of a type having an automatic transmission mounted therein, and more particularly to shift lever control devices of a floor-mounted type which has the shift lever slidably moved in a cranked guide slot.

2. Description of the Prior Art

One conventional shift lever control device of the floor-mounted type is disclosed in Japanese Utility Model First Provisional Publication No. 60-195225.

However, due to its inherent construction, the conventional device of the publication is compelled to have additional switches, such as overdrive switch, first speed switch and the like, with increase in gear speeds needed. As is known, usage of additional switches causes the shift lever control device to have a complicated and highly cost construction. Furthermore, the usage of the additional switches requires a complicated movement of the shift lever because the ON-OFF operations of these switches must be controlled by the movement of the shift lever in sequential manner.

SUMMARY OF THE INVENTION

It is therefore an object of the present invention to provide a shift lever control device of the floor-mounted type, which is free of the above-mentioned drawbacks.

According to the present invention, there is provided a shift lever control device which is equipped with only one switch for detecting various shift positions of the shift lever.

According to a first aspect of the present invention, there is provided a shift lever control device which comprises pivot means for permitting a shift lever to pivot in both first and second directions which are perpendicular to each other; a bracket which is pivotal together with the shift lever in the first direction, the bracket having a mounting portion; a cam plate rotatably mounted on the mounting portion, the cam plate being engaged with the shift lever so that when the shift lever pivots in the second direction, the cam plate is rotated on the mounting portion; check means for making the rotational movement of the cam plate in a snap action manner; means defining a cam surface on a periphery of the cam plate; and a single switch having a sensor pin which slidably contacts with the cam surface of the cam plate, the switch selectively assuming ON and OFF conditions in response to the rotational movement of the cam plate.

According to a second aspect of the present invention, there is provided a shift lever control device which comprises means for defining a cranked guide slot along and in which a shift lever slidably moves, the slot including a first laterally extending part, a first longitudinally extending part, a second laterally extending part and a second longitudinally extending part which are connected in order; pivot means for permitting the shift lever to pivot in both first and second directions which are perpendicular to each other, the first direction being the direction along which the first and second longitudinal parts of the guide slot extend and the second direction being the direction along which the first and second laterally extending parts of the guide slot extend; a bracket which is pivotal together with the shift lever in the first direction, the bracket having a mounting portion; a cam plate rotatably mounted on the mounting portion, the cam plate being engaged with the shift lever so that when the shift lever pivots in the second direction, the cam plate is rotated on the mounting portion; check means for making the rotational movement of the cam plate in a snap action manner; means defining a cam surface on a periphery of the cam plate; and a single switch having a sensor pin which slidably contacts with the cam surface of the cam plate, the switch selectively assuming ON and OFF conditions in response to the rotational movement of the cam plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
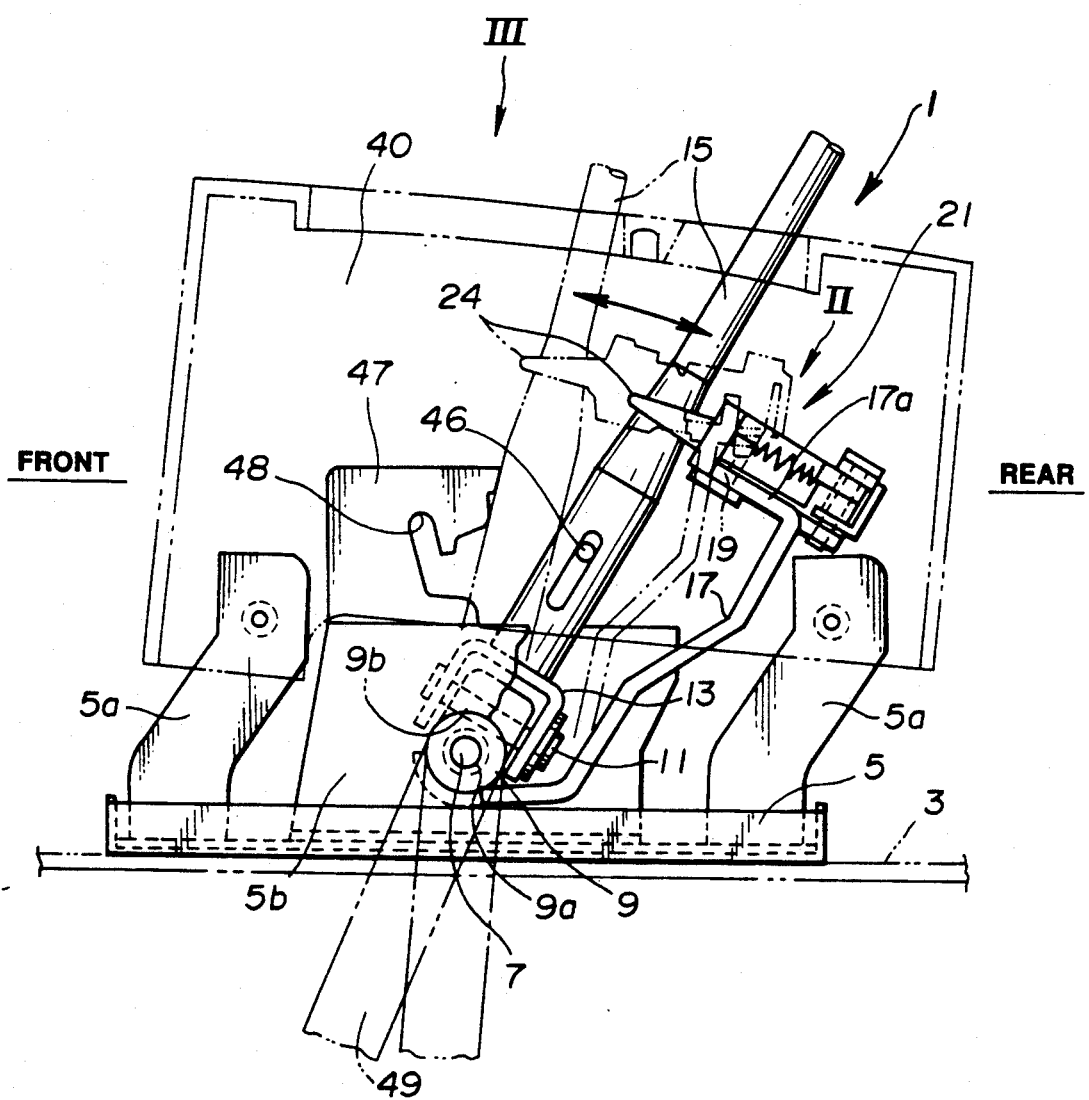
FIG. 1 is a vertically sectional view of a shift lever control device according to the present invention.
Figure 2:
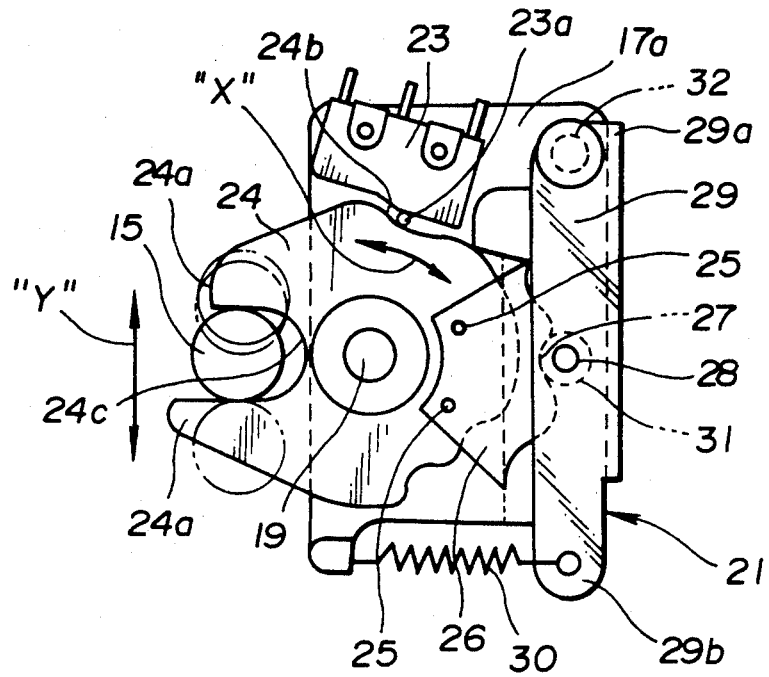
FIG. 2 is a view taken from the direction of the arrow "II" of FIG. 1.
Figure 3:
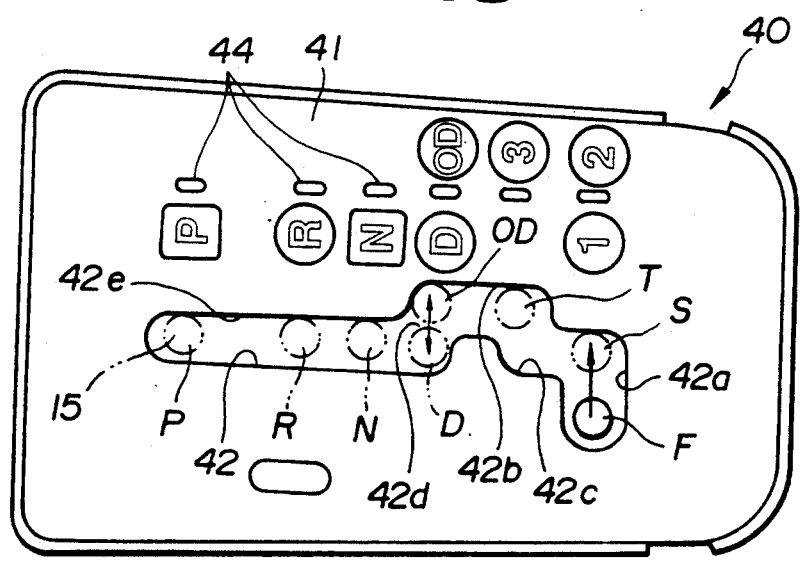
FIG. 3 is a view taken from the direction of the arrow "III" of FIG. 1.

Referring to FIGS. 1 to 3 of the drawings, there is shown a shift lever control device 1 which the present invention embodies.

Throughout the specification, the terms "front", "rear", "left", "right", "forward", "rearward", and the like are to be understood with respect to a vehicle body to which the shift lever control device of the invention is mounted.

As is best seen in FIG. 1, the shift lever control device 1 comprises a base bracket 5 which is securely disposed on a floor panel 3 of the vehicle body. Two, viz., right and left side walls 5b are raised from the base bracket 5, between and by which a first pivot pin 7 is supported. Rotatably disposed about the first pivot pin 7 is a hollow rotation shaft 9. The hollow of the rotation shaft 9 through which the first pivot pin 7 passes is denoted by reference mark 9a. The rotation shaft 9 is formed with a raised upper portion which has a through bore 9b. The through bore 9b extends perpendicular to the axis of the hollow 9a of the rotation shaft 9.

A second pivot pin 11 passes through the through bore 9b for pivotally connecting leg portions of a generally U-shaped bracket 13 to the raised upper portion of the rotation shaft 9.

Thus, the rotation shaft 9 and the bracket constitute a so-called "universal joint".

A connecting lever 49 extending from an automatic transmission (not shown) is secured to the universal joint to move therewith.

A shift lever 15 is secured at its lower end to a base portion of the bracket 13. Thus, the shift lever 15 is pivotal forward and rearward about the first pivot pin 7 as well as leftward and rightward about the second pivot pin 11.

A check holder bracket 17 extends upward from the rotation shaft 9. Thus, the forward and rearward pivoting of the shift lever 15 induces an integral movement of the check holder bracket 17 about the first pivot pin 7.

The check holder bracket 17 is formed with a flat top portion 17a on which a check mechanism 21 is mounted.

As is seen from FIG. 2, the check mechanism 21 comprises a generally circular cam plate 24 which is rotatably mounted through a pivot pin 19 to the flat top portion 17a of the check holder bracket 17. Thus, the cam plate 24 is rotatable about the pin 19 in the directions of the arrow "X".

The cam plate 24 has two pawl portions 24a and 24a by and between which a rounded recess 24c is defined for slidably receiving therein a cylindrical portion of the shift lever 15. It is now to be noted that when the shift lever 15 is pivoted rightward and leftward, that is, in the directions of the arrow "Y" (see FIG. 2) about the second pivot pin 11, the cam plate 24 is rotated in the directions of the arrow "X".

The cam plate 24 has, at a diametrically opposed portion of the rounded recess 24c, a check plate 26 secured thereto through rivets 25. The check plate 26 has a waved peripheral portion which comprises two spaced rounded projections and a rounded recess 27 which is defined between the two rounded projections. Slidably engaged with the waved peripheral portion of the check plate 26 is a roller 31 which is rotatably connected through a pin 28 to an intermediate portion of a biasing pivotal lever 29. The lever 29 has one end 29a which is pivotally connected through a pin 32 to the flat top portion 17a of the check holder bracket 17 and the other end 29b to which a biasing spring 30 extending from a front end of the flat top portion 17a is connected. Due to the biasing force of the spring 30, the roller 31 is pressed against the waved peripheral portion of the check plate 26, and thus, the pivotal movement of the cam plate 24 about the pivot pin 19 is effected in a so-called "snap action manner". More specifically, the cam plate 24 can be pivoted from its center position as shown in FIG. 2 to its rightmost or leftmost angled position in a snap action manner.

The cam plate 24 has a cam surface 42b near a shift switch 23 which is secured to the flat top portion 17a of the check holder bracket 17. The shift switch 23 has a sensor pin 23a which slidably and operatively to contacts to the cam surface 42b.

As will be understood from FIG. 3, when, due to shifting of the shift lever 15 from "drive position" D to "overdrive position" OD, or from "second speed position" S to "first speed position" F, the cam plate 24 is pivoted from the center position to its rightmost angled position or to its leftmost angled position, and the cam surface 24b of the cam plate 24 causes the shift switch 23 to assume ON condition.

Referring back to FIG. 1, designated by numeral 47 is a position plate which is secured to the base bracket 5. The position plate 47 has an aperture whose upper periphery constitutes a check cam surface 48. Operatively engaged with the check cam surface 48 is a check pin 46. The check pin 46 is fixed to a cancel rod (not shown) which is axially slidably disposed in the shift lever 15 and biased upward by a spring (not shown). Thus, the check pin 46 is pressed against the check cam surface 48 of the position plate 47. The cancel rod has at its top a push button (not shown).

Designated by numeral 40 is s shift lever housing which is supported by front and rear brackets 5a and 5a raised from the base bracket 5. The housing 40 has an integral upper flat wall 41 (see FIG. 3).

As is seen from FIG. 3, the upper flat wall all is formed with a longitudinally extending cranked guide slot 42 through which the cylindrical portion of the shift lever 15 passes. Thus, the shift lever 15 is compelled to move along a cranked way which is defined by the cranked guide slot 42. As is seen from FIG. 3, the guide slot 42 comprises a first laterally extending part 42a, a first longitudinally extending part 42b which is connected to the part 42a through a normally bent part 42c, a second laterally extending part 42d connected to the part 42b and a second longitudinally extending part 42e connected to the part 42d. The second longitudinally extending part 42e is the longest, as shown.

Beside the first laterally extending part 42a, there are provided gear position marks "1" (1'st speed) and "2" (2'nd speed), and beside the first longitudinally extending part 42b, there is provided a gear position mark "3" (3'rd speed). Beside the second laterally extending part 42d, there are provided gear position marks "D" (drive) and "OD" (over drive), and beside the second longitudinally extending part 42e, there are provided gear position marks "N" (Neutral), "R" (Reverse) and "P" (Parking). These position marks "1", "2", "3", "OD", "D", "N", "R", and "P" indicate the positions (viz., First, Second, Third, Overdrive, Drive, Neutral, Reverse and Parking positions) which the associated transmission can assume. These position marks are constructed to be illuminated from within by a known illumination device mounted in the shift lever housing 40.

The marks "1", "D", "N", "R" and "P" are laid on a first imaginary line and the other marks "2", "3" and "OD" are laid on a second imaginary line which is in parallel with the first imaginary line.

Between the first and second imaginary lines of the marks, there are aligned six light emitting diodes (LED) 44, each diode being positioned beside the corresponding mark, as shown. Each diode becomes energized to emit light when the shift lever 15 comes to a corresponding gear position.

Although not shown in the drawings, a known inhibitor switch is arranged on the position plate 47 to sense a longitudinal position of the shift lever 15.

In the following, the operation will be described with reference to the drawings.

For ease of understanding, the description will be commenced with respect to a condition wherein the shift lever 15 assumes "P" (Parking) position. Under this condition, the check pin 46 of the cancel rod is latchingly engaged with a frontmost notch of the check cam surface 48 of the position plate 47, and the cam plate 24 assumes the center position as shown in FIG. 2, having the rounded recess 27 of the check plate 26 operatively engaged with the spring biased roller 31.

When the push button on the top of the shift lever 15 is pushed to cancel the latched engagement of the check pin 46 with the frontmost notch of the position plate 47 and then the shift lever 15 is pulled rearward with the push button kept pushed, the shift lever 15 is permitted to move toward "D" (Drive) position (see FIG. 3). During this movement, the shift lever 15 pivots about the first pivot pin 7, and the cam plate 24 (see FIG. 2) is kept unchanged.

When, upon arrival at "D" position, the shift lever 15 is applied with a suitable force, the same is permitted to move to "OD" (Overdrive) position (see FIG. 3). During this movement, the shift lever 15 pivots about the second pivot pin 11, and the cam plate 24 (see FIG. 2) is forced to turn to the rightmost angled position in a snap action manner. Due to this pivoting of the cam plate 24, the shift switch 23 changes its condition from "OFF" to "ON". This "ON" signal is used for changing the condition of the automatic transmission from "D" (Drive) condition to "OD" (Overdrive) condition.

When then the shift lever 15 is applied with a suitable force, the same can be moved to the 7 (3'rd speed) position. During this movement, the shift lever 15 pivots above the first pivot pin 7 and the cam plate 24 keeps the rightmost angled position. The inhibitor switch senses this movement of the shift lever 15 and thus the transmission can change its condition from "OD" condition to 7 (3'rd speed) condition.

When then the shift lever 15 is applied with a suitable force, the same can be moved to the S (2'nd speed) position. During this movement, the shift lever 15 universally pivots about both the first and second pivot pins 7 and 11, and the cam plate 24 (see FIG. 2) is forced to turn from the rightmost angled position to the center position as shown in FIG. 2. Either one of the shift switch 23 and the inhibitor switch can sense this position change, and thus, the transmission can change its condition from T (3'rd speed) condition to S (2'nd speed) condition.

When then the shift lever 15 is applied with a suitable force, the same can be moved to the F (1'st speed) position. During this movement, the shift lever 15 pivots about the second pivot pin 11 and the cam plate 24 (see FIG. 2) is forced to turn from the center position to the leftmost angled position. Due to this pivoting of the cam plate 24, the shift switch 23 can sense the position change of the shift lever 15. Thus, the transmission can change its condition from S (2'nd speed) condition to F (1'st speed) condition.

The shifting of the shift lever 15 from F (1'st speed) position to "P" (Parking) position is carried out in a reversed manner.

As will be understood from the foregoing description, in the present invention, the shift switch 23 can sense not only the position change of the shift lever 15 between "D" and "OD" positions but also the position change between S and F positions. In other words, in the present invention, four positions "D", "OD", S and F of the shift lever 15 can be sensed by only a single shift switch 23. This is very advantageous in obtaining a shift lever control device which has a simple and low-cost construction. Furthermore, usage of only one switch induces a simple and smooth movement of the shift lever because the movement requires only the ON-OFF operation of the single switch.

What is claimed is:

1. A shift lever control device comprising:
   pivot means for permitting a shift lever to pivot in both first and second directions which are perpendicular to each other;
   a bracket connected to said pivot means so that a pivot movement of said shift lever in said first direction induces an integral movement of said bracket, said bracket having a mounting portion;
   a cam plate rotatably mounted on said mounting portion, said cam plate being engaged with said shift lever so that when said shift lever pivots in said second direction, said cam plate is rotated on said mounting portion; check means for making the rotational movement of said cam plate in a snap action manner; and
   means defining a cam surface on a periphery of said cam plate; and
   a single switch having a sensor pin which slidably contacts with said cam surface of the cam plate, said switch selectively assuming ON and OFF conditions in response to the rotational movement of said cam plate.

2. A shift lever control device as claimed in claim 1, in which said check means is so constructed as to permit said cam plate to take a rightmost angled position, a center position and a leftmost angled position in a snap action manner.

3. A shift lever control device as claimed in claim 2, in which said switch is so constructed and arranged as to change its state from OFF condition to ON condition when said cam plate is turned from said center position to either one of said rightmost and leftmost positions, 4. A shift lever control device as claimed in claim 3, in which said check means comprises:
   a check plate secured to said cam plate to rotate therewith, said check plate having a waved peripheral portion which includes two spaced rounded projections and a rounded recess which is defined between the said rounded projections;
   a pivotal lever having one end pivotally connected to said mounting portion of said bracket;
   a roller rotatably connected to said pivotal lever; and
   biasing means for biasing said pivotal lever in a direction to press said roller against said waved peripheral portion of said check plate.

5. A shift lever control device as claimed in claim 4, in which said biasing means is a spring which extends between the other end of said pivotal lever and said mounting portion.

6. A shift lever control device as claimed in claim 4, in which said cam plate is formed with a rounded recess for slidably receiving therein a cylindrical portion of said shift lever.

7. A shift lever control device comprising:
   means for defining a cranked guide slot along and in which a shift lever slidably moves, said slot including a first laterally extending part, a first longitudinally extending part, a second laterally extending part and a second longitudinally extending part which are connected in order;
   pivot means for permitting said shift lever to pivot in both first and second directions which are perpendicular to each other, said first direction being the direction along which said first and second longitudinally extending parts of said guide slot extend and said second direction being the direction along which said first and second laterally extending parts of said guide slot extend;
   a bracket connected to said pivot means so that a pivot movement of said shift lever in said first direction induce an integral movement of said bracket, said bracket having a mounting portion;
   a cam plate rotatably mounted on said mounting portion, said cam plate being engaged with said shift lever so that when said shift lever pivots in said second direction, said cam plate is rotated on said mounting portion;
   check means for making the rotational movement of said cam plate in a snap action manner; and
   means defining a cam surface on a periphery of said cam plate; and
   a single switch having a sensor pin which slidably contacts with said cam surface of the cam plate, said switch selectively assuming ON and OFF conditions in response to the rotational movement of said cam plate.

8. A shift lever control device as claimed in claim 7, in which said first laterally extending part of said guide slot has a terminal end which is positioned at an opposite side of a terminal end of said second laterally extending part with respect to a longitudinal axis of said second longitudinally extending part.

9. A shift lever control device as claimed in claim 8, in which said check means is so constructed as to permit said cam plate to take a rightmost angled position, a center position and a leftmost angled position in a snap action manner.

10. A shift lever control device as claimed in claim 9, in which said cam plate is so arranged as to assume said center position when said shift lever is put in said second longitudinally extending part of the guide slot, and assume said rightmost angled position when said shift lever is positioned at the terminal end of said second laterally extending part, and assume said leftmost angled position when said shift lever is positioned at the terminal end of said first laterally extending part.

11. A shift lever control device as claimed in claim 10, in which said switch is so constructed and arranged as to change its state from OFF condition to ON condition when said cam plate is turned from said center position to either one of said rightmost and leftmost positions.

12. A shift lever control device as claimed in claim 11, in which said check mans comprises:
  a check plate secured to said cam plate to rotate therewith, said check plate having a waved peripheral portion which includes two spaced rounded projections and a rounded recess which is defined between said rounded projections;
  a pivotal lever having one end pivotally connected to said mounting portion of said bracket;
  a roller rotatably connected to said pivotal lever; and
  biasing means for biasing said pivotal lever in a direction to press said roller against said waved peripheral portion of said check plate.

13. A shift lever control device as claimed in claim 12, in which said biasing means is a spring which extends between the other end of said pivotal lever and said mounting portion.

14. A shift lever control device as claimed in claim 12, in which said cam plate is formed with a rounded recess for slidably receiving therein a cylindrical portion of said shift lever.

* * * * *